United States Patent
Imai et al.

(10) Patent No.: US 10,590,901 B2
(45) Date of Patent: Mar. 17, 2020

(54) SWITCH DEVICE

(71) Applicant: KABUSHIKI KAISHA TOKAI RIKA DENKI SEISAKUSHO, Aichi (JP)

(72) Inventors: Toshiaki Imai, Aichi (JP); Ryoji Takahashi, Aichi (JP); Shuichi Iwata, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

(21) Appl. No.: 16/150,848

(22) Filed: Oct. 3, 2018

(65) Prior Publication Data

US 2019/0107095 A1    Apr. 11, 2019

(30) Foreign Application Priority Data

Oct. 10, 2017   (JP) .................. 2017-196836

(51) Int. Cl.
*F02N 11/08* (2006.01)
*B60R 25/25* (2013.01)
*H01H 13/14* (2006.01)
*G06K 9/00* (2006.01)

(52) U.S. Cl.
CPC ........ *F02N 11/0803* (2013.01); *B60R 25/252* (2013.01); *G06K 9/0002* (2013.01); *G06K 9/00013* (2013.01); *H01H 13/14* (2013.01); *F02N 2200/106* (2013.01)

(58) Field of Classification Search
CPC .... B60R 25/252; G06K 9/0002; H01H 13/14; F02N 11/0803; F02N 2200/106
USPC .................. 123/179.1, 179.3, 630
See application file for complete search history.

(56) References Cited

U.S. PATENT DOCUMENTS

| | | | | |
|---|---|---|---|---|
| 5,963,679 A * | 10/1999 | Setlak | ................. | G06K 9/0002 382/312 |
| 6,100,811 A * | 8/2000 | Hsu | .................... | B60H 1/00642 340/426.36 |
| 6,522,773 B1 * | 2/2003 | Houdeau | ............. | G06K 9/0002 340/5.83 |
| 6,614,920 B2 * | 9/2003 | Floyd | .................... | B60R 25/021 340/5.53 |
| 6,727,800 B1 * | 4/2004 | Dutu | ................. | B60R 25/02102 123/179.1 |
| 8,892,272 B1 * | 11/2014 | Wooding | ............. | B60R 25/252 340/5.52 |
| 9,002,586 B2 * | 4/2015 | Feit | ...................... | B60R 25/252 340/5.53 |
| 9,619,638 B2 * | 4/2017 | Dow | .................... | B60R 16/037 |

(Continued)

FOREIGN PATENT DOCUMENTS

JP    2008-291710 A    12/2008

*Primary Examiner* — Erick R Solis
(74) *Attorney, Agent, or Firm* — Roberts Calderon; Safran & Cole, P.C.

(57) ABSTRACT

A switch device includes an operation button operated by a push operation on an operating surface including an opening, a biometric sensor that includes a reading surface exposed in the opening of the operating surface and reads, during the push operation, biometric information of an operator who touches the reading surface, and a packing arranged between the operation button and the biometric sensor to prevent extraneous matter from entering through the opening.

8 Claims, 3 Drawing Sheets

(56) References Cited

U.S. PATENT DOCUMENTS

| | | | | |
|---|---|---|---|---|
| 9,651,513 | B2* | 5/2017 | Dunlap | G06K 9/00053 |
| 9,870,033 | B1* | 1/2018 | Browning | H03K 17/975 |
| 10,083,337 | B2* | 9/2018 | Kim | G06K 9/0002 |
| 10,351,098 | B2* | 7/2019 | Gennermann | B60R 25/2018 |
| 2002/0034321 | A1* | 3/2002 | Saito | G06K 9/00006 |
| | | | | 382/124 |
| 2005/0206502 | A1* | 9/2005 | Bernitz | B60R 25/2018 |
| | | | | 340/5.82 |
| 2008/0265186 | A1* | 10/2008 | Sumi | H01L 27/14618 |
| | | | | 250/552 |
| 2010/0060412 | A1* | 3/2010 | Johnson | B60R 25/04 |
| | | | | 340/5.53 |
| 2010/0246902 | A1* | 9/2010 | Rowe | G06K 9/00033 |
| | | | | 382/115 |
| 2011/0260830 | A1* | 10/2011 | Weising | G06F 3/015 |
| | | | | 340/5.52 |
| 2012/0085822 | A1* | 4/2012 | Setlak | G06K 9/0002 |
| | | | | 235/439 |
| 2013/0307818 | A1* | 11/2013 | Pope | G06F 3/044 |
| | | | | 345/174 |
| 2014/0002237 | A1* | 1/2014 | Infante | B60R 25/252 |
| | | | | 340/5.32 |
| 2015/0071509 | A1* | 3/2015 | Myers | G06K 9/0002 |
| | | | | 382/124 |

\* cited by examiner

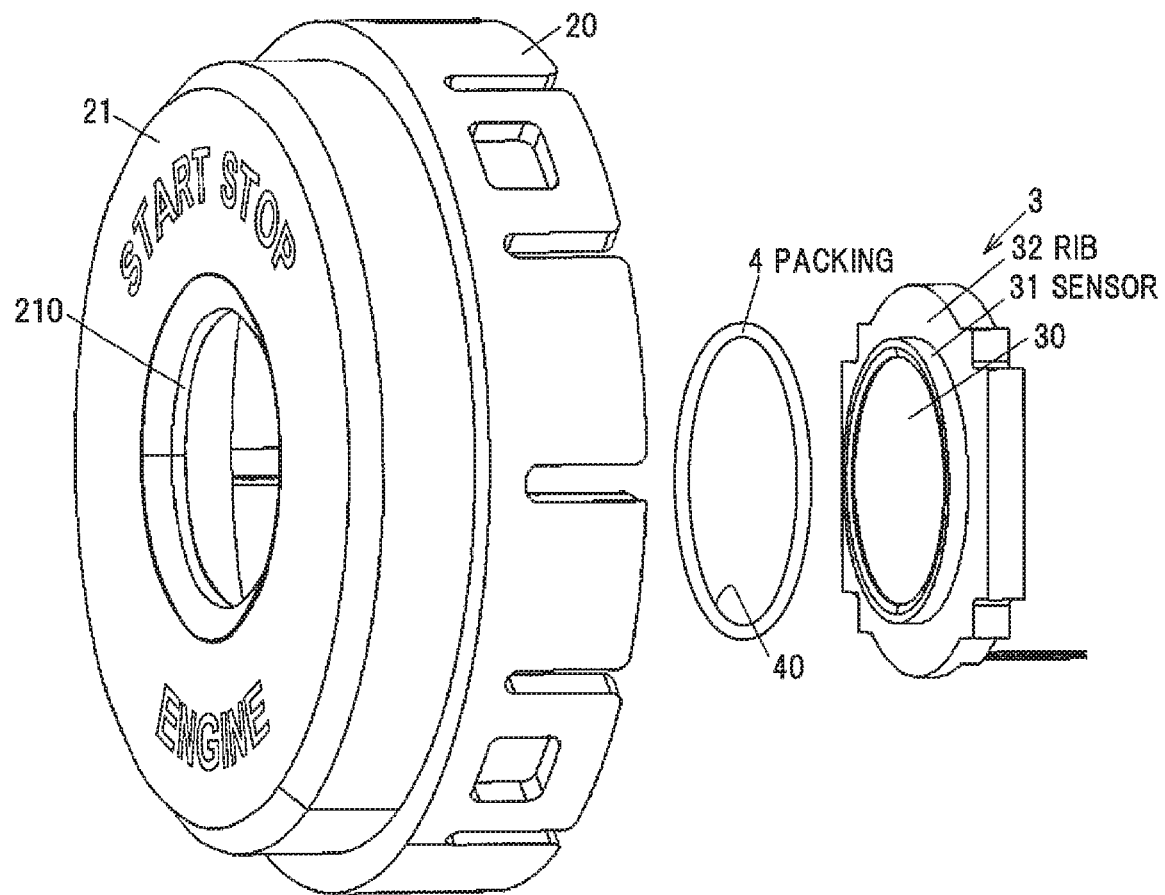
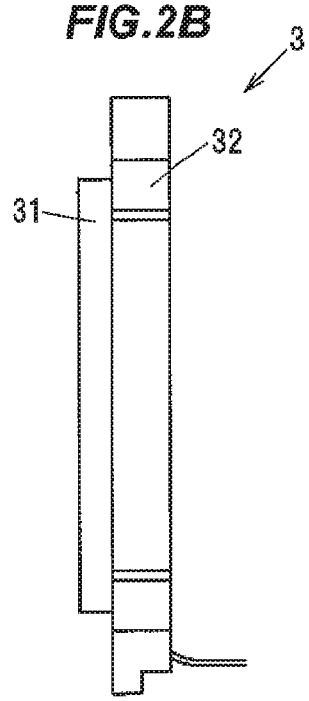
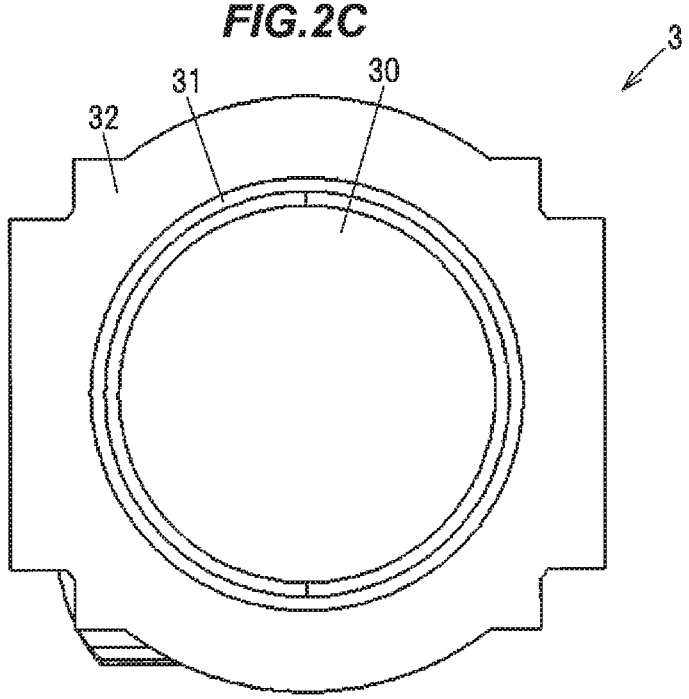

SWITCH DEVICE

CROSS-REFERENCE TO RELATED APPLICATION

The present application is based on Japanese patent application No. 2017-196836 filed on Oct. 10, 2017, the entire contents of which are incorporated herein by reference.

TECHNICAL FIELD

The invention relates to a switch device.

Background Art

Starting device is known as a conventional technique, which is provided with a light source for alcohol-based detection by which light containing an alcohol absorption light component with a wavelength absorbed by an alcohol component is emitted onto the periphery of a switch, an image capturing means for capturing an image of a finger of a driver who operates the switch, and a detection means which, based on the image captured by the image capturing means, detects whether or not the alcohol absorption light component is absorbed by the finger of the driver (see, e.g., JP 2008/291710 A).

This starting device is further provided with an authentication means for authenticating a person's identity based on biometric information of the finger of the driver, and is configured to activate an operation of starting a vehicle motor when the person is authenticated by the authentication means as well as when absorption of the alcohol absorption light component is not detected by the detection means.

SUMMARY OF INVENTION

Such conventional switch devices, which are configured to read biometric information of an operator during when the operator is pushing an operation button of a switch, have a problem that when, e.g., a sensor for reading biometric information as the authentication means is arranged inside the operation button, it is difficult to ensure reading accuracy since an operating finger is distant from the sensor. On the other hand, when a sensor is exposed on an operating surface in such switch devices to ensure reading accuracy, there is a problem that extraneous matters get inside through a gap.

It is an object of the invention to provide a switch device that prevents entrance of extraneous matter and ensures accuracy of reading biometric information.

According to an embodiment of the invention, a switch device comprises:
  an operation button operated by a push operation on an operating surface comprising an opening;
  a biometric sensor that comprises a reading surface exposed in the opening of the operating surface and reads, during the push operation, biometric information of an operator who touches the reading surface; and
  a packing arranged between the operation button and the biometric sensor to prevent extraneous matter from entering through the opening.

Effects of Invention

According to an embodiment of the invention, a switch device can be provided that prevents entrance of extraneous matter and ensures accuracy of reading biometric information.

BRIEF DESCRIPTION OF DRAWINGS

FIG. 2A is a schematic explanatory diagram illustrating an example of an operation button, a packing and a biometric sensor of the start switch device in the embodiment.

FIG. 2B is a side view showing the example of the biometric sensor.

FIG. 2C is a top view showing the example of the biometric sensor.

DESCRIPTION OF EMBODIMENTS

Summary of Embodiment

A switch device in the embodiment is generally provided with an operation button operated by a push operation on an operating surface having an opening, a biometric sensor that has a reading surface exposed in the opening of the operating surface and reads, during the push operation, biometric information of an operator who touches the reading surface, and a packing arranged between the operation button and the biometric sensor to prevent extraneous matter from entering through the opening.

Since the switch device is configured that the reading surface of the biometric sensor is exposed on the operating surface of the operation button, it is possible to ensure accuracy of reading biometric information. In addition, since the switch device has the packing between the operation button and the biometric sensor, it is possible to prevent entrance of extraneous matter. Thus, the switch device can prevent entrance of extraneous matter and also can ensure accuracy of reading biometric information, unlike when such configuration is not adopted.

Embodiment

General Description of Start Switch Device 1

Figure 1A:
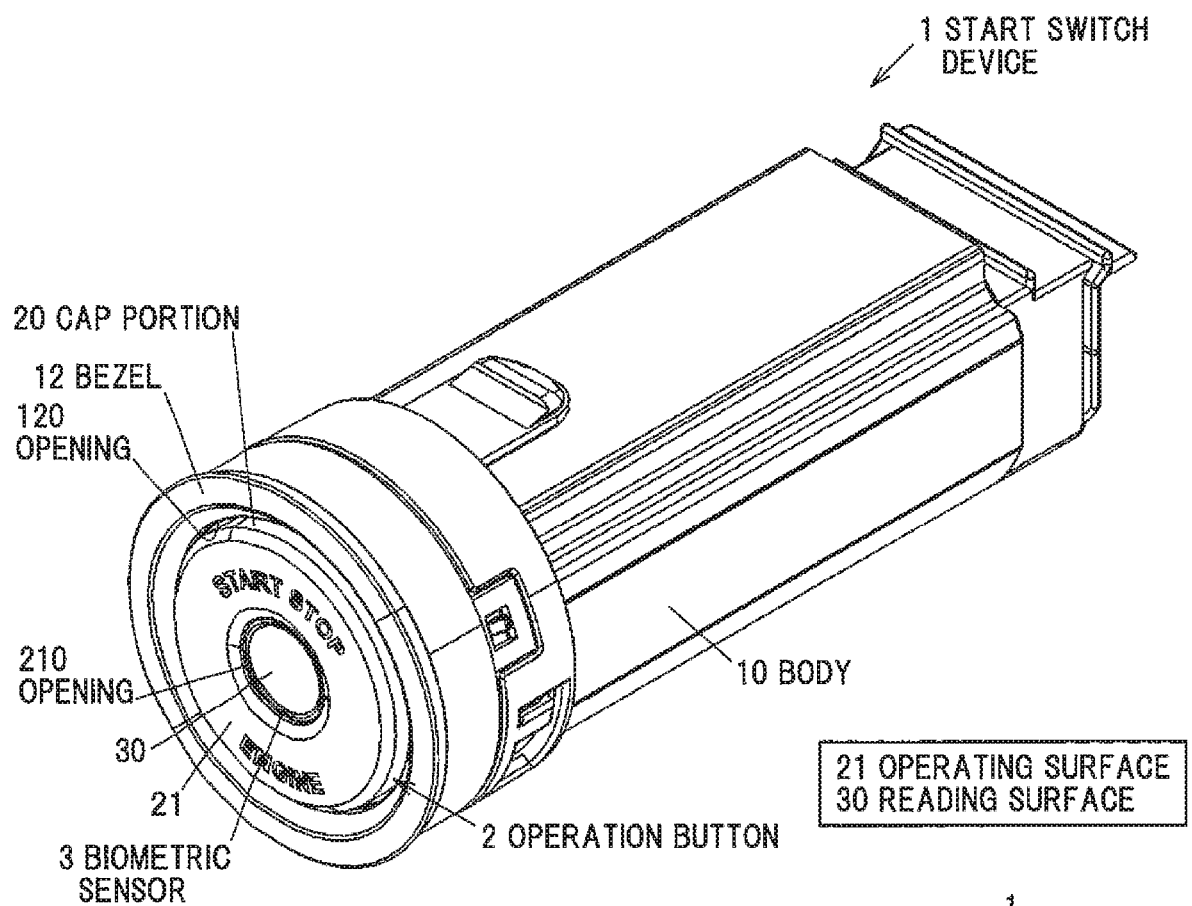
FIG. 1A is a perspective view showing an example of a start switch device in an embodiment.
Figure 1B:
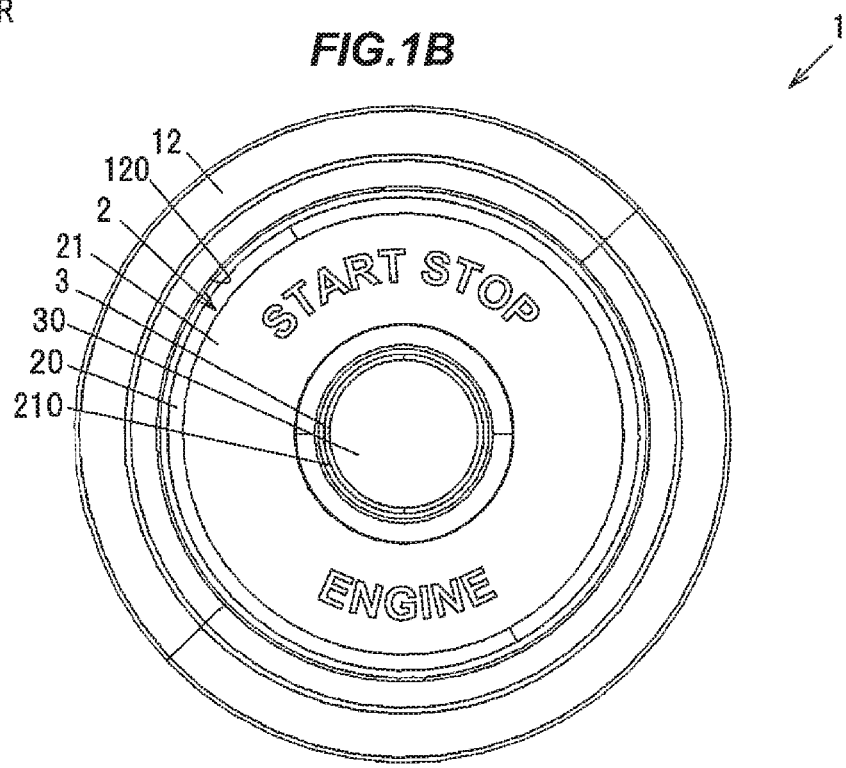
FIG. 1B is a front view showing the example of the start switch device.

FIG. 1A is a perspective view showing an example of a start switch device in an embodiment and FIG. 1B is a front view showing the example of the start switch device.

Figure 3A:
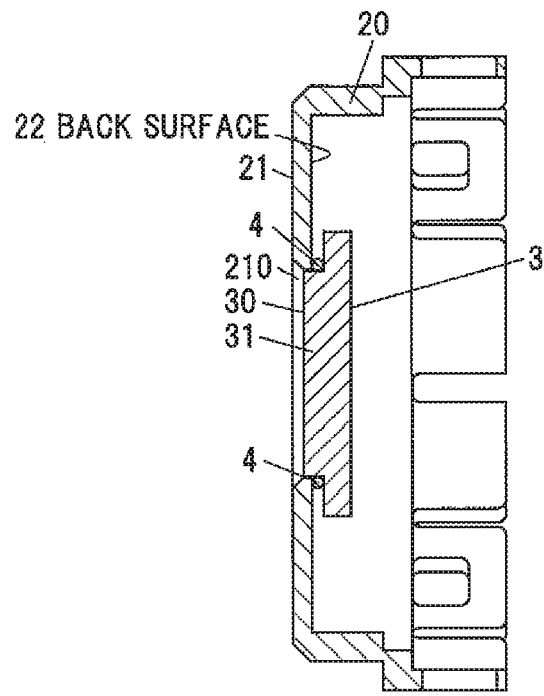
FIG. 3A is an explanatory cross-sectional view of an essential portion to show an example position of the packing in the start switch device in the embodiment.
Figure 3B:
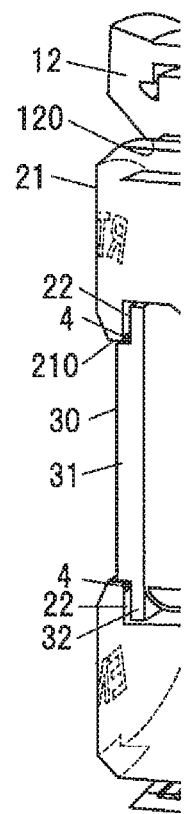
FIG. 3B is an explanatory cross-sectional perspective view showing the example position of the packing.

FIG. 2A is a schematic explanatory diagram illustrating an example of an operation button, a packing and a biometric sensor of the start switch device in the embodiment, FIG. 2B is a side view showing the example of the biometric sensor and FIG. 2C is a top view showing the example of the biometric sensor. FIG. 3A is an explanatory cross-sectional view of an essential portion to show an example position of the packing in the start switch device in the embodiment and FIG. 3B is an explanatory cross-sectional perspective view showing the example position of the packing. In each drawing of the embodiment described below, a scale ratio may be different from an actual ratio.

The start switch device 1 as the switch device is generally provided with, e.g., an operation button 2 operated by a push operation on an operating surface 21 having an opening 210, a biometric sensor 3 which has a reading surface 30 exposed in the opening 210 of the operating surface 21 and reads, during the push operation, biometric information of an operator who touches the reading surface 21, and a packing 4 arranged between the operation button 2 and the biometric sensor 3 to prevent extraneous matter from entering through the opening 210, as shown in FIGS. 1A to 3B.

The biometric sensor 3 has, e.g., a rib 32 around the reading surface 30 as shown in FIGS. 2A to 2C. The packing 4 is sandwiched by the operation button 2 and the rib 32.

As an example, the start switch device 1 is configured that the biometric sensor 3 can read the biometric information after doors are unlocked upon authentication based on wireless communication with an electronic key, etc., and drive voltage is supplied from a battery of a vehicle.

In the vehicle, a drive system is started when switches of the start switch device 1 are turned on by a push operation and identity is established by the matching of the biometric information.

The drive system is, e.g., an internal combustion engine, a motor, or a combination thereof, etc. The start switch device 1 is configured to give an instruction to start/stop the drive system. However, the switch device is not limited to the start switch device 1 for giving an instruction to start/stop a drive system of a vehicle and can be used for other purposes.

Configuration of the Operation Button 2

The operation button 2 is arranged, e.g., inside a cylindrical body 10 and is formed by combining several parts, as shown in FIGS. 1A to 2A. For example, as shown in FIGS. 1A and 1B, a bezel 12 is attached to an end of the body 10 and the operating surface 21 of the operation button 2 is exposed in an opening 120 of the bezel 12.

The operation button 2 has, e.g., a cap portion 20 at a top end and a surface of the cap portion 20 is the operating surface 21, as shown in FIG. 2A.

The opening 210 having a circular shape is formed on the operating surface 21 of the cap portion 20. A portion around the opening 210 is tapered. As an example, the cap portion 20 has a size allowing sufficient contact between an operating finger and the reading surface 30.

Configuration of the Biometric Sensor 3

The biometric sensor 3 is arranged so that the reading surface 30 is located at the center of the operating surface 21 of the operation button 2. The biometric sensor 3 is configured that the reading surface 30 for reading the biometric information has a circular shape and is exposed on the operating surface 21. The position of the reading surface 30 is lower than, e.g., the operating surface 21.

The biometric sensor 3 is configured to read the biometric information of the operating finger in contact with the operating surface 21. As an example, the biometric information includes image information of at least one of fingerprint pattern and vein pattern of the operating finger.

When configured to read, e.g., a fingerprint pattern, the biometric sensor 3 is generally constructed from an optical, capacitive, electric field strength measuring, pressure-sensitive, or thermal sensor.

Meanwhile, when configured to read, e.g., a vein pattern, the biometric sensor 3 is generally configured to read a vein pattern based on reflection of infrared radiation.

As an example, the biometric sensor 3 in the present embodiment is a capacitive sensor which reads a fingerprint.

The biometric sensor 3 is generally provided with, e.g., a sensor 31 having the reading surface 30 and the rib 32, as shown in FIGS. 2A to 2C. The sensor 31 has plural driving electrodes and plural sensing electrodes under the reading surface 30. The biometric sensor 3 senses capacitance by using all combinations of the driving electrodes and the sensing electrodes. The sensor 31 has a columnar shape and is arranged upright from the rib 32.

The rib 32 extends from the outer periphery of the sensor 31. The packing 4 is arranged on the rib 32 around the sensor 31. The packing 4 is arranged, e.g., between a back surface 22 of the cap portion 20 and the rib 32 as shown in FIGS. 3A and 3B, and is attached in an elastically deformed state.

Since the biometric sensor 3 can be exposed, e.g., in the opening 210 of the operating surface 21 as shown in FIG. 3A, the operating finger comes into contact directly with the reading surface 30, unlike when the biometric sensor 3 is not exposed.

When, e.g., the biometric sensor 3 is arranged in contact with the back surface 22 of the cap portion 20 which does not have the opening 210, a distance from the operating surface 21 to the reading surface 30 is larger than when the biometric sensor 3 is exposed, and it is considered that reading accuracy is thereby reduced. Also when, e.g., a film, etc., covering the reading surface 30 and the operating surface 21 is provided, a distance from the operating surface 21 to the reading surface 30 is larger than when the biometric sensor 3 is exposed, and it is considered that reading accuracy is thereby reduced.

However, since the biometric sensor 3 in the present embodiment is configured that the reading surface 30 is exposed in the opening 210 of the operating surface 21, the operating finger can come into contact directly with the reading surface 30 and it is thus possible to ensure accuracy of reading biometric information.

Configuration of the Packing 4

The packing 4 has, e.g., a ring shape as shown in FIG. 2A. The packing 4 is formed of, e.g., a material with a small reaction force. As an example, the packing 4 is formed of urethane foam or synthetic rubber, etc.

A ring opening 40 of the packing 4 has a shape into which the sensor 31 of the biometric sensor 3 can be fitted. The packing 4 is, e.g., squashed, i.e., elastically deformed as shown in FIGS. 3A and 3B and thereby prevents extraneous matter from entering through a gap between the opening 210 and the biometric sensor 3. The extraneous matter here is, e.g., liquid such as water, dirt or dust, etc.

Effects of the Embodiment

The start switch device 1 in the present embodiment can prevent entrance of extraneous matter and also can ensure accuracy of reading biometric information. In detail, the start switch device 1 is configured that the reading surface 30 of the biometric sensor 3 is exposed on the operating surface 21 of the operation button 2. Therefore, unlike when the biometric sensor 3 is not exposed, the operating finger can come into contact directly with the reading surface 30 and it is thereby possible to ensure accuracy of reading biometric information. In addition, since the start switch device 1 has the packing 4 between the operation button 2 and the biometric sensor 3, it is possible to prevent entrance of extraneous matter. Thus, the start switch device 1 can prevent entrance of extraneous matter and also can ensure accuracy of reading biometric information, unlike when such configuration is not adopted.

In the start switch device 1, the packing 4 form of a material with a small reaction force is used. Therefore, unlike when using a packing with a large reaction force, a distance between the biometric sensor 3 and the cap portion 20 is appropriately maintained and reading accuracy is stable.

Although some embodiment and modifications of the invention have been described, the embodiment and modifications are merely an example and the invention according to claims is not to be limited thereto. The new embodiment and modifications may be implemented in various other forms, and various omissions, substitutions and changes, etc., can be made without departing from the gist of the invention. In addition, all combinations of the features described in the embodiment and modifications are not necessary to solve the problem of the invention. Further, the embodiment and modifications are included within the scope and gist of the invention and also within the invention described in the claims and the range of equivalency.

The invention claimed is:

1. A switch device, comprising:
    an operation button comprising an operating surface and an opening formed in the operating surface, the operation button being operated by a push operation on the operating surface;
    a biometric sensor that comprises a reading surface exposed in the opening of the operating surface and reads, during the push operation, biometric information of an operator who touches the reading surface; and
    a packing arranged between the operation button and the biometric sensor to prevent extraneous matter from entering through the opening,
    wherein the packing is sandwiched between the operation button and the biometric sensor in an elastically deformed state at all times in a push direction of the operation button.

2. The switch device according to claim 1, wherein the biometric sensor comprises a rib around the reading surface, and the packing is sandwiched by the operation button and the rib.

3. The switch device according to claim 1, wherein the operation button comprises a vehicle drive system start switch.

4. The switch device according to claim 1, wherein the opening has a size allowing sufficient contact between an operator's finger and the reading surface.

5. The switch device according to claim 1, wherein the biometric sensor is configured such that the reading surface is located at a center of the operating surface of the operation button.

6. The switch device according to claim 1, wherein the reading surface of the biometric sensor is lower than the operating surface of the operation button.

7. The switch device according to claim 1, wherein the packing directly contacts the operation button on one side and the biometric sensor on the other side.

8. The switch device according to claim 3, wherein the packing directly contacts the operation button on one side and the biometric sensor on the other side.

* * * * *